US012036518B2

(12) United States Patent
Liu et al.

(10) Patent No.: US 12,036,518 B2
(45) Date of Patent: Jul. 16, 2024

(54) CARBON MOLECULAR SIEVE MEMBRANE PRODUCED FROM A CARBON FORMING POLYMER-POLYVINYLIDENE CHLORIDE COPOLYMER BLEND

(71) Applicant: Dow Global Technologies LLC, Midland, MI (US)

(72) Inventors: Junqiang Liu, Freeport, TX (US); Liren Xu, Spring, TX (US); Janet M. Goss, Saginaw, MI (US); Troy D. Wolford, Midland, MI (US)

(73) Assignee: Dow Global Technologies LLC, Midland, MI (US)

( * ) Notice: Subject to any disclaimer, the term of this patent is extended or adjusted under 35 U.S.C. 154(b) by 297 days.

(21) Appl. No.: 17/424,703

(22) PCT Filed: Jan. 15, 2020

(86) PCT No.: PCT/US2020/013646
§ 371 (c)(1),
(2) Date: Jul. 21, 2021

(87) PCT Pub. No.: WO2020/154146
PCT Pub. Date: Jul. 30, 2020

(65) Prior Publication Data
US 2022/0080361 A1 Mar. 17, 2022

Related U.S. Application Data

(60) Provisional application No. 62/796,927, filed on Jan. 25, 2019.

(51) Int. Cl.
*B01D 67/00* (2006.01)
*B01D 53/22* (2006.01)
(Continued)

(52) U.S. Cl.
CPC ......... *B01D 71/301* (2022.08); *B01D 53/228* (2013.01); *B01D 67/0083* (2013.01);
(Continued)

(58) Field of Classification Search
CPC .... B01D 69/02; B01D 71/40; B01D 67/0067; B01D 71/021; B01D 67/0009;
(Continued)

(56) References Cited

U.S. PATENT DOCUMENTS 3,306,874 A   2/1967   Hay
3,306,875 A   2/1967   Hay
(Continued)

FOREIGN PATENT DOCUMENTS

EP   0459623 B1   8/1991
JP   S50146304 A   11/1975
(Continued)

OTHER PUBLICATIONS

Examination Report dated Oct. 5, 2022, pertaining to EP Patent Application No. 20704734.1, 6 pgs.
(Continued)

*Primary Examiner* — Monica A Huson
(74) *Attorney, Agent, or Firm* — Dinsmore & Shohl LLP

(57) ABSTRACT

A carbon molecular sieve (CMS) membrane may advantageously be made by pyrolyzing a membrane precursor composition comprised of a carbon forming polymer (e.g., polyimide) blended with a polyvinylidene chloride copolymer (PVDC), the polyvinylidene chloride copolymer being the reaction product of at least 60% to 97% by weight of vinylidene chloride and at least one other comonomer and the carbon forming polymer to polyvinylidene chloride copolymer has a weight ratio of greater than 1 to 99. The membrane precursor composition may be formed by dissolving the carbon forming polymer and PVDC in a solvent
(Continued)

to form a dope solution. The dope solution may be shaped, for example, into an asymmetric hollow fiber. The asymmetric hollow fiber may be heated to a temperature to dehydrochorinate the PVDC and then subsequently heated in a non-oxidizing atmosphere to carbonize the polymers of the shaped membrane to form the CMS membrane.

14 Claims, 4 Drawing Sheets

(51) Int. Cl.
    *B01D 69/02*     (2006.01)
    *B01D 69/08*     (2006.01)
    *B01D 71/02*     (2006.01)
    *B01D 71/30*     (2006.01)
    *B01D 71/64*     (2006.01)
    *B01D 71/76*     (2006.01)
    *B29D 99/00*     (2010.01)
    *B29K 105/00*     (2006.01)

(52) U.S. Cl.
    CPC ............. *B01D 69/02* (2013.01); *B01D 69/08* (2013.01); *B01D 71/021* (2013.01); *B01D 71/643* (2022.08); *B01D 71/76* (2013.01); *B29D 99/005* (2013.01); *B01D 2325/0233* (2022.08); *B29K 2105/0085* (2013.01)

(58) Field of Classification Search
    CPC .. B01D 71/64; B01D 53/228; B01D 67/0083; B01D 69/08; B01D 71/76; B01D 71/30; B01D 67/0079; B01D 2257/702; B01D 2257/7022; B01D 2325/022; B01D 2325/24; B01D 2256/24; B01D 2257/504; B01D 2257/108; B29D 99/005; B29K 2105/0085; Y02C 20/40; Y02C 20/20
    See application file for complete search history.

(56) References Cited

U.S. PATENT DOCUMENTS

| | | | |
|---|---|---|---|
| 3,384,619 | A | 5/1968 | Hori et al. |
| 3,432,466 | A | 3/1969 | Hay |
| 3,639,656 | A | 2/1972 | Bennett et al. |
| 3,642,699 | A | 2/1972 | Cooper et al. |
| 3,661,848 | A | 5/1972 | Cooper et al. |
| 3,733,299 | A | 5/1973 | Cooper et al. |
| 3,862,076 | A | 1/1975 | Dawson et al. |
| 4,028,341 | A | 6/1977 | Hay |
| 4,113,628 | A | 9/1978 | Alegranti |
| RE30,351 | E | 7/1980 | Hoehn et al. |
| 4,378,324 | A | 3/1983 | Makino et al. |
| 4,460,526 | A | 7/1984 | Makino et al. |
| 4,474,662 | A | 10/1984 | Makino et al. |
| 4,485,056 | A | 11/1984 | Makino et al. |
| 4,512,893 | A | 4/1985 | Makino et al. |
| 4,705,540 | A | 11/1987 | Hayes |
| 4,717,394 | A | 1/1988 | Hayes |
| 4,983,191 | A | 1/1991 | Ekiner et al. |
| 5,288,304 | A | 2/1994 | Koros et al. |
| 5,820,659 | A | 10/1998 | Ekiner et al. |
| 6,565,631 | B2 | 5/2003 | Koros et al. |
| 9,211,504 | B2 | 12/2015 | Bhuwania et al. |
| 2010/0133187 | A1* | 6/2010 | Liu .................... B01D 67/0079 210/640 |
| 2018/0369761 | A1 | 12/2018 | Hessler et al. |
| 2020/0206696 | A1* | 7/2020 | Ma .................... B01J 20/28033 |
| 2021/0138407 | A1* | 5/2021 | Liu ......................... B01D 69/12 |

FOREIGN PATENT DOCUMENTS

| | | |
|---|---|---|
| JP | 20180167135 A | 11/2018 |
| WO | 2016048612 A1 | 3/2016 |
| WO | 2017165098 A1 | 9/2017 |
| WO | 2018187004 A1 | 10/2018 |

OTHER PUBLICATIONS

K. M. Steel and W. J. Koros Investigation of Porosity of Carbon Materials and Related Effects on Gas Separation Properties Carbon 41 253 (2003).
K. M. Steel and W. J. Koros An Investigation of the Effects of Pyrolysis Parameters on Gas Separation Properties of Carbon Materials Carbon 43 1843 (2005).
H. Suda and K. Haraya Gas Permeation Through Micropores of Carbon Molecular Sieve Membranes Derived From Kapton Polyimide J. Phys. Chem. B 101 3988 (1997).
V. C. Geiszler and W. J. Koros Effects of Polyimide Pyrolysis Atmosphere on Separation Performance of Carbon Molecular Sieve Membranes Ind. Eng. Chem. Res. 35 2999 (1996)).
L. Xu et al. Journal of Membrane Science 380 (2011) 138-147.
Xu Liren Ph.D Thesis Dissertation Carbon Molecular Sieve Hollow Fiber Membranes for Olefin/paraffin Separations Georgia Tech. Univ. 2014 pp. 136-138 and 142.
S. Fu E.S. Sanders S.S. Kulkarni W.J. Koros Carbon molecular sieve membrane structure-property relationships for four novel 6FDA based polyimide precursors J. Membr. Sci. 487(0) (2015) 60-73.
Bhuwania Nitesh Ph.D. Thesis Dissertation. (2015). Engineering the Morphology of Carbon Molecular Sieve (CMS) Hollow Fiber Membranes Georgia Tech. Univ. 2015 pp. 184-187.
Kirk-Othmer Encyclopedia of Chemical Technology "Fluorine-Containing Polymers Poly(Vinylidene Fluoride)" J. Dohany (2000).
Kirk-Othmer Encyclopedia of Chemical Technology vol. 5 "Cellulose Esters Organic Esters" S. Gedon & R. Fengi (2000).
International Search Report and Written Opinion pertaining to PCT/US2020/013646, dated Mar. 24, 2020.
International Preliminary Report on Patentability pertaining to PCT/US2020/013646, dated Jul. 27, 2021.
Encyclopedia of Polymer Science vol. 8, "Vinyl Chloride Polymers", M. W. Allsop & G. Vianello, John Wiley and Sons, pp. 437-476, (2002).
Encyclopedia of Polymer Science vol. 1, "Acrylonitrile and Acrylonitrile Polymers", M. Wu, John Wiley and Sons, pp. 124-174, (2001).
EP 161/162 Communication pertaining to European Patent Appl. No. 20704734.1 dated Sep. 10, 2021, 3 pgs.
Fu et al. "The Significance of Entropic Selectivity in Carbon Molecular Sieve Membranes Derived for 6FDA/DETDA: DABA(3:2) Polyimide" Elsevier, 2017, 8 pgs.
Xu "Carbon Molecular Sieve Hollow Fiber Membranes for Olefin/Paraffin Separations" Georgia Institute of Technology, Dec. 2012, 237 pgs.
Xu et al. "Olefins-selective asymmetric carbon molecular sieve hollow fiber membranes for hybrid membrane-distillation processes for olefin/paraffin separations" Journal of Membrane Science 423-424 (2012) 314-323, 10 pgs.
Examination Report dated Sep. 4, 2023, pertaining to EP Patent Application No. 20704734.1, 4 pgs.
Chinese Office Action and Search Report, dated Jan. 31, 2024, pertaining to CN Patent Application No. 202080013317.2, 20 pgs.

* cited by examiner

CARBON MOLECULAR SIEVE MEMBRANE PRODUCED FROM A CARBON FORMING POLYMER-POLYVINYLIDENE CHLORIDE COPOLYMER BLEND

CROSS REFERENCE TO RELATED APPLICATIONS

This application claims priority to U.S. Provisional Patent Application No. 62/796,927, filed on Jan. 25, 2019, the entire disclosure of which is hereby incorporated by reference.

FIELD OF THE INVENTION

The invention relates to polymer membranes useful for making carbon molecular sieve (CMS) membranes that may be used to separate gases. In particular the invention relates to a method for producing CMS membranes from a carbon forming polymer and polyvinlylidene chloride copolymer (PVDC) blend.

BACKGROUND OF THE INVENTION

Figure 1:
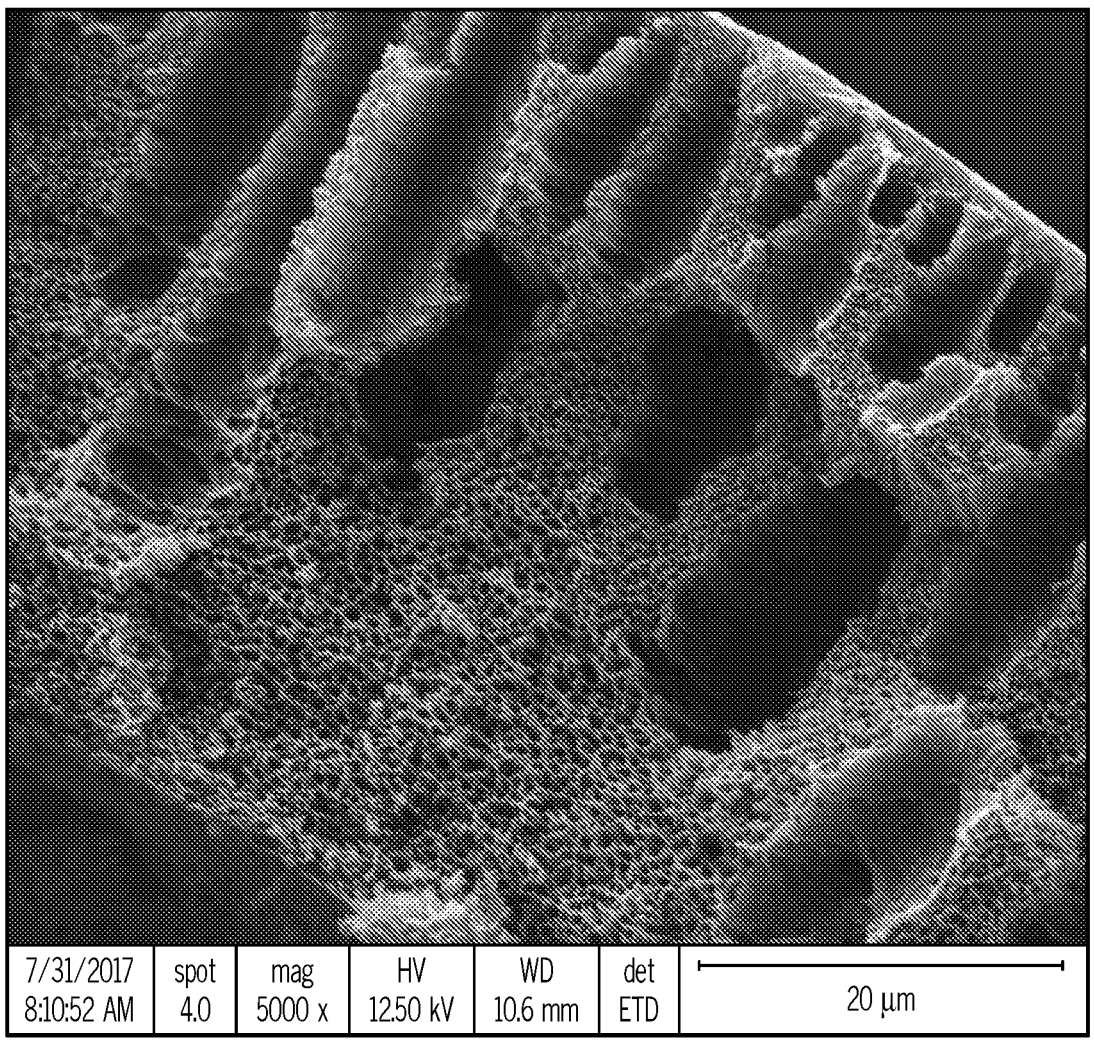
FIG. 1 is a scanning electron micrograph of a cross-section of a portion of a polyimide-PVDC asymmetric hollow fiber of this invention.

Membranes are widely used for the separation of gases and liquids, including for example, separating acid gases, such as $CO_2$ and $H_2S$ from natural gas, and the removal of $O_2$ from air. Gas transport through such membranes is commonly modeled by the sorption-diffusion mechanism. Currently, polymeric membranes are well studied and widely available for gaseous separations due to easy process-ability and low cost. CMS membranes, however, have been shown to have attractive separation performance properties exceeding that of polymeric membranes.

Polyimides have been pyrolyzed to form CMS membranes under many differing conditions. U.S. Pat. No. 6,565,631 discloses pyrolyzing under vacuum and inert gases with trace amounts of oxygen. Other patents describe processes for producing carbon membranes (both asymmetric hollow "filamentary" and flat sheets), and applications for gas separation, include, for example, U.S. Pat. No. 5,288,304, and EP Patent No. 0459623. Steel and Koros performed a detailed investigation of the impact of pyrolysis temperature, thermal soak time, and polymer composition on the performance of carbon membranes. (K. M. Steel and W. J. Koros, *Investigation of Porosity of Carbon Materials and Related Effects on Gas Separation Properties*, Carbon, 41, 253 (2003); K. M. Steel and W. J. Koros, *An Investigation of the Effects of Pyrolysis Parameters on Gas Separation Properties of Carbon Materials*, Carbon, 43, 1843 (2005)). In these works membranes were produced in an air atmosphere at 0.03 mm Hg pressure.

The impact of pyrolysis atmosphere has been researched. Suda and Haraya disclosed the formation of CMS membranes under different environments. (H. Suda and K. Haraya, *Gas Permeation Through Micropores of Carbon Molecular Sieve Membranes Derived From Kapton Polyimide*, J. Phys. Chem. B, 101, 3988 (1997).) Similarly, Geiszler and Koros disclosed the results of CMS fibers produced from pyrolysis of fluorinated polyimide in helium and argon for both $O_2/N_2$ and $H_2/N_2$ separations. (V. C. Geiszler and W. J. Koros, *Effects of Polyimide Pyrolysis Atmosphere on Separation Performance of Carbon Molecular Sieve Membranes*, Ind. Eng. Chem. Res., 35, 2999 (1996)).

When making asymmetric hollow fibers CMS membranes from polyimides, which have a thin dense separating layer and thick inner porous support structure, it has been difficult to make the hollow fibers without having undesired structural collapse. Structural collapse results in an undesired thicker separating layer resulting in poor permeance of desired permeate gases rendering the fibers commercially impractical. (see L. Xu, et al. *Journal of Membrane Science*, 380 (2011), 138-147).

To address this problem, complicated involved methods have been described such as in U.S. Pat. No. 9,211,504. In this patent, the application of a sol-gel silica that undergoes cross-linking on the inner porous walls of the polyimide is described to reduce the structural collapse during pyrolysis to form the hollow fiber CMS membrane. Recently, WO/2016/048612 describes a separate particular preoxidation of particular polyimides, such as 6FDA/BPDA-DAM, having the stoichiometry shown in Formula 1. Formula 1 shows a chemical structure for 6FDA/BPDA-DAM where X and Y are each 1 so as to provide a 1:1 ratio.

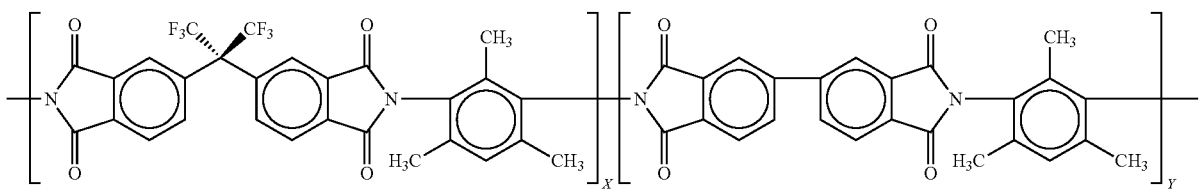

This polyimide after undergoing the pre-oxidation was reported to decrease the structural collapse and reduce sticking of the fibers during and after pyrolysis.

It also has been reported that a particular polyimide referred to 6FDA-DAM/DABA (3:2) as shown below, that undergoes cross linking by decarboxylation through the DABA moiety, also decreased structural collapse, but resulted in undesirably low permeances for low molecular olefins making them unsuitable for separation of these from their corresponding paraffins. (Xu, Liren, Ph.D Thesis Dissertation, *Carbon Molecular Sieve Hollow Fiber Membranes for Olefin/paraffin Separations*, Georgia Tech. Univ., 2014, pages 136-138 and 142).

A third aspect of the present invention is a method wherein the carbon forming polymer-polyvinylidene chloride copolymer carbon molecular sieve membrane precursor

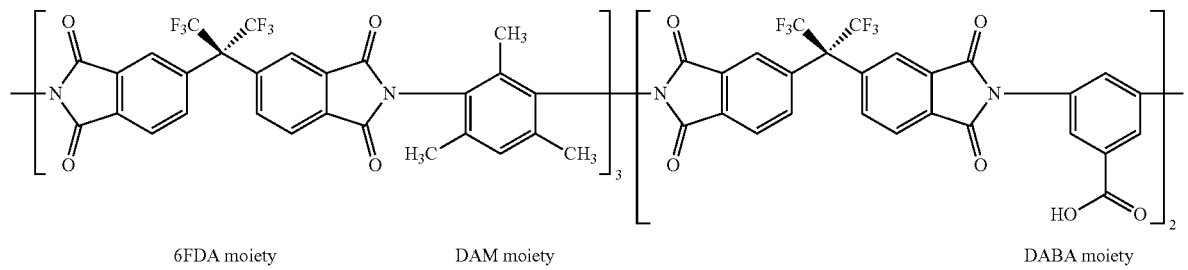

6FDA moiety    DAM moiety                                         DABA moiety

However, a subsequent study reported that cross-linking MATRIMID polyimide asymmetric hollow fiber using a diamine cross-linking compound failed to reduce the structural collapse of the separating layer of the hollow fiber. (Bhuwania, Nitesh, Ph.D. Thesis Dissertation. (2015). *Engineering the Morphology of Carbon Molecular Sieve (CMS) Hollow Fiber Membranes*, Georgia Tech. Univ. 2015, pages 184-187).

It would be desirable to provide a polyimide membrane or like polymer and a method of making the polyimide or like polymer membrane as well as a method to pyrolyze the polyimide to form a CMS membrane that avoids any one of the problems mentioned above. For example, it would be desirable to provide a method that did not involve any further process steps involving heat-treatments or treatments prior to pyrolysis of the polyimide membrane to form a carbon molecular sieve membrane. It would also be desirable for the CMS membrane to not exhibit, structural collapse while still having sufficient permeance to effectively separate valuable light hydrocarbons such as ethylene, propylene and butylene from their corresponding paraffins.

SUMMARY OF THE INVENTION

A first aspect of the invention is a membrane precursor composition comprised of a carbon forming polymer blended with a polyvinylidene chloride copolymer, the polyvinylidene chloride copolymer being the reaction product of at least 60% to 97% by weight of vinylidene chloride and at least one other comonomer and the carbon forming polymer to polyvinylidene chloride copolymer has a weight ratio of greater than 1 to 99.

A second aspect of the present invention is a method of forming a carbon forming polymer-polyvinylidene chloride copolymer carbon molecular sieve membrane precursor comprising,
(i) dissolving a carbon forming polymer and a polyvinylidene chloride copolymer, polyvinlylidine chloride copolymer being the reaction product of at least 60% by weight of vinylidene chloride and at least one other comonomer and the carbon forming polymer and polyvinylidene chloride copolymer are present in a weight ratio of greater than 1 to 99 carbon forming polymer/polyvinlylidine chloride copolymer to form a dope of the carbon forming polymer and polyvinylidene chloride copolymer in the solvent,
(ii) shaping the dope solution to form a shape, and
(iii) removing the solvent to form the carbon forming polymer-polyvinylidene chloride copolymer carbon molecular sieve membrane precursor.

of the second aspect is heated to a dehydrochlorination temperature from 100° C. to 180° C. to form a dehydrochlorinated precursor carbon molecular sieve membrane A fourth aspect of the invention is a method to form a carbon molecular sieve membrane comprising, heating the dehydrochlorinated precursor carbon molecular sieve membrane of the third aspect to a pyrolysis temperature of 450° C. to 1200° C. for a time of at least 15 minutes to 72 hours under a nonoxidizing atmosphere.

Surprisingly the blending of a carbon forming polymer such as a polyimide with a polyvinylidene chloride copolymer (PVDC) realizes an improved carbon molecular sieve (CMS) membrane. For example, the resultant CMS membrane may have one or more advantages over a CMS made from, for example, the same polyimide. Exemplary advantages include improved permeance for desirable gases yet still having good selectivity and reduced or elimination of structural collapse of separating layers in asymmetric membranes (e.g., asymmetric hollow fibers) while also retaining good mechanical strength. These advantages occur even though PVDC yields much lower carbon compared to polyimides (about 25% v about 50% respectively). Illustratively, the precursor membrane may allow for the production of a CMS membrane having good selectivity for similar sized gas molecules (e.g., hydrogen/ethylene; ethylene/ethane; propylene/propane and butylene/butane) while still having higher permeance of the target permeate gas molecule (e.g., hydrogen in gases containing hydrogen/ethylene). That is, the selectivity/permeance characteristics (productivity) are substantially improved relative to CMS asymmetric hollow fiber membranes made using polyimides in the absence of the PVDC.

CMS membranes of the present invention are particularly useful for separating gas molecules in gas feeds that have very similar molecular sizes such as hydrogen/ethylene and ethylene/ethane. It may also be used to separate gases from atmospheric air such as oxygen or separating gases (e.g., methane) in natural gas feeds.

DETAILED DESCRIPTION OF THE INVENTION

In forming the desired CMS membranes, a carbon forming polymer-PVDC composition blend is typically formed by dissolving them to form a dope solution and then shaping the dope into a desired shape as described below. The carbon forming polymer to polyvinylidene chloride copolymer are blended in a weight ratio of greater than 1 to 99. Desirably, the blend weight ratio of the carbon forming polymer to PVDC is at least 1.5 or 2 to 50, 25, 10 or 5.

A carbon forming polymer, herein is one that yields a greater amount of carbon than the PVDC composition in the blend. This typically means the carbon forming polymer yields at least about 25% by weight of the starting polymer when heated to the pyrolysis temperatures described herein under non-oxidizing conditions. Generally, the amount of carbon yield is at least 30%, 35%, 40% or greater than 45% to about 70%. Exemplary carbon forming polymers include polyimides, polyetherimides, polyamides, polyvinyl chlorides, polyvinylidene fluorides, cellulose esters (e.g., cellulose acetates), polyacrylonitriles, polyphenylene oxides or polyphenylene ether commonly blended with styrene, or combinations thereof. Generally, the carbon forming polymer has substantial amounts of aromaticity such as greater than 50% by weight aromaticity and desirably at least 75% aromaticity by weight. Preferably the carbon forming polymer is a polyimide, polyetherimide or combination thereof and most preferably a polyimide.

Exemplary polyetherimides for forming the membrane precursor composition may include any known such as those formed by reacting aromatic bis(ether anhydride)s and organic diamines such as those described in U.S. Pat. Nos. 3,847,867; 3,991,004 and 4,156,597. An example of a suitable polyetherimide includes ULTEM polyetherimide resins available from Sabic, Houston, TX (Sabic). An example of a particular polyetherimide is ULTEM 1000 resin having the below chemical formula.

such as cellulose acetate may be employed in the present invention such as those described in *Kirk-Othmer Encyclopedia of Chemical Technology Vol. 5, "Cellulose Esters, Organic Esters"*, S. Gedon & R. Fengi, (2000). Any polyphenylene oxides may be used as the carbon forming polymer such as those known in the art, such as those described by U.S. Pat. Nos. 3,306,874; 3,306,875; 3,432,466; 3,384,619; 3,639,656; 3,642,699; 3,661,848; 3,733,299 and 4,028,341. A commercially available blend of polyphenylene oxide and styrene may be used such as those available under the tradename NORYL from Sabic, Houston, TX.

Exemplary polyimides for forming the membrane precursor composition may include any of the aromatic polyimides described by U.S. Pat. No. 4,983,191 from col. 2, line 65 to col. 5, line 28. Other aromatic polyimides that may be used are described by U.S. Pat. Nos. 4,717,394; 4,705,540; and re30351. Generally, suitable aromatic polyimides typically are a reaction product of a dianhydride and a diamine, which is understood to proceed by forming a polyamic acid intermediate that is subsequently ring-closed to form the polyimide by chemical and/or thermal dehydration. Desirable polyimides typically contain at least two different moieties arising from a diamine and dianhydride monomer selected from 2,4,6-trimethyl-1,3-phenylene diamine (DAM), dimethyl-3,7-diaminodiphenyl-thiophene-5,5'-dioxide (DDBT), 3,5-diaminobenzoic acid (DABA), 5(6)-amino-1-(4'-aminophenyl)-1,3,3-trimethylindane (DAPI), 2.3,5,6-tetramethyl-

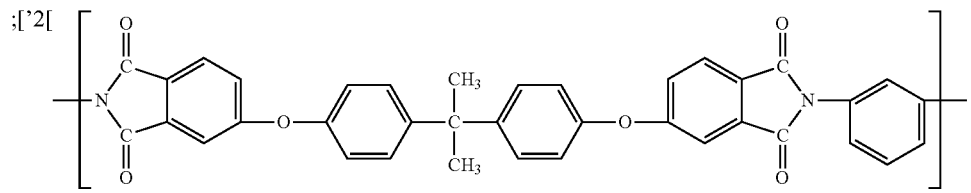

Any vinyl chloride polymer (polyvinyl chloride, PVC") such as those made by known processes may be used as the carbon forming polymer. For example, the PVC may be made by bulk, solution, suspension and dispersion (emulsion) polymerization methods such as described in *Encyclopedia of Polymer Science Vol. 8, "Vinyl Chloride Polymers"*, M. W. Allsop & G. Vianello, John Wiley and Sons, pp. 437-476, (2002).". An example of one such method to make PVC is described in U.S. Pat. No. 3,862,076. Suitable commercially available PVC may be obtained from Sigma-Aldrich Inc., St. Louis, MO Likewise any known acrylonitrile polymer may be used such as described in *Encyclopedia of Polymer Science Vol. 1, "Acrylonitrile and Acrylonitrile Polymers"*, M. Wu, John Wiley and Sons, pp. 124-174, (2001). Any known polyamides such as aliphatic, semi-aromatic or aromatic polyamide may be used, with the aromatic or semi-aromatic polyamide being preferred. Examples of commercially available polyamides include, for example, those sold under the tradenames ZYTEL, TECHNYL, RILSAN, RADIPOL, TROGAMID T, AMODEL, KEVLAR, NOMEX, TEIJINCONEX, TWARON, AND TECHNORA. Any polyvinylidene fluoride may be employed such as those known such as described in *Kirk-Othmer Encyclopedia of Chemical Technology, "Fluorine-Containing Polymers, Poly(Vinylidene Fluoride)"*, J. Dohany, (2000). Any known cellulose ester 1,4-phenylene diamine (durene), tetramethylmethylenedianaline (TMMDA), 4,4'-diamino 2,2'-biphenyl disulfonic acid (BDSA); 5,5'-[2,2,2-trifluoro-1-(trifluoromethyl)ethylidene]-1,3-isobenzofurandion (6FDA), 3,3',4,4'-biphenyl tetracarboxylic dianhydride (BPDA), pyromellitic dianhydride (PMDA), 1,4,5,8-naphthalene tetracarboxylic dianhydride (NTDA), and benzophenone tetracarboxylic dianhydride (BTDA), with two or more of 6FDA, BPDA and DAM being preferred. In another embodiment, the polyimide is formed from at least one of the following diamines: is 2,4,6-trimethyl-1,3-phenylenediamine (DAM), 3,5-diaminobenzoic acid (DABA), 2,3,5,6-tetramethyl-1,4-phenylenediamine (durene), or tetramethylmethylenedianiline (TMMDA).

In a particular embodiment the polyimide is one that is designated 6FDA/BPDA-DAM. It may be synthesized via thermal or chemical processes from a combination of three monomers: DAM; 6FDA, and BPDA, each commercially available for example from Sigma-Aldrich Inc., St. Louis, MO The below chemical structure represents 6FDA/BPDA-DAM, with a potential for adjusting the ratio between X and Y to tune polymer properties. As used in examples below, a 1:1 ratio of component X and component Y may also abbreviated as 6FDA/BPDA(1:1)-DAM.

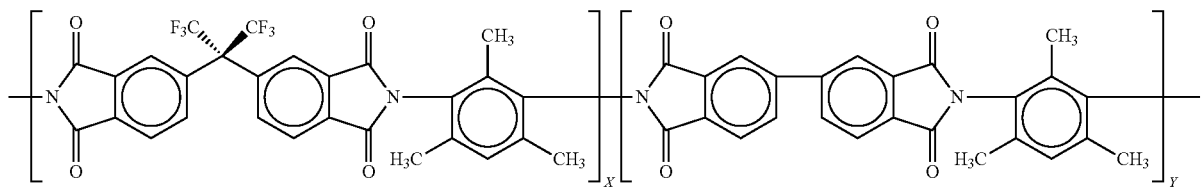

A second particular polyimide embodiment, designated as 6FDA-DAM, lacks BPDA such that Y equals zero in Formula 1 above. The below chemical structure below shows represents the polyimide.

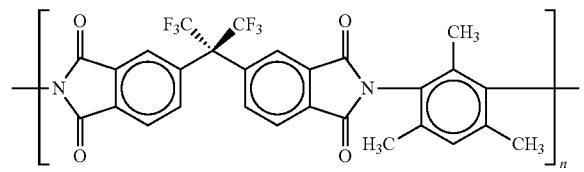

A third useful polyimide is MATRIMID™ 5218 (Huntsman Advanced Materials Americas, The Woodlands, Texas), a commercially available polyimide that is a copolymer of 3,3',4,4'-benzo-phenonetetracarboxylic acid dianhydride and 5(6)-amino-1-(4'-aminophenyl)-1,3,3-trimethylindane (BTDA-DAPI).

Generally, the carbon forming polymer, such as the polyimide, has a molecular weight sufficient to form the precursor membrane composition in a dope solution which is then formed into shape such as a hollow fiber having the requisite strength to be handled and subsequently pyrolyzed, but not so high that it becomes impractical to dissolve to make a dope solution able to form the hollow fiber also containing the PVDC. Illustratively, the weight average ($M_w$) molecular weight of a polyimide carbon forming polymer is 30 to 200 kDa, but desirably the molecular weight of 40 to 100 kDa. Polymer molecular weight may be controlled by stoichiometry of dianhydride to diamine monomers, monomer purity, as well as use of monofunctional endcapping agents such as monoamines (i.e., aniline, 3-ethynylaniline) and monoanhydrides (i.e., phthalic anhydride, succinic anhydride, maleic anhydride).

The PVDC may be any useful one made from a vinylidene chloride monomer and at least one additional comonomer. The comonomer may be selected from a variety of materials, including in particular embodiments a vinyl monomer, vinyl chloride monomer, an acrylate monomer, a methacrylate monomer, a styrenic monomer, acrylonitrile, methacrylonitrile, itaconic acid, chlorotrifluoroethylene, and combinations thereof. In more particular embodiments examples of the vinyl monomers include vinyl chloride, vinyl acetate, acrylonitrile, and combinations thereof. More particular examples of the acrylate monomers include methyl acrylate, ethyl acrylate, butyl acrylate, and combinations thereof. More particular examples of methacrylate monomers include methyl methacrylate, butyl methacrylate, and combinations thereof. A more particular example of styrenic monomers is styrene itself.

The PVDC includes at least 60 wt % of vinylidene chloride, based on total weight of the copolymer, and in more preferred embodiments at least 70 wt %. However, it is further desired that the PVDC contains a maximum of 97 wt % vinylidene chloride, and thus preferably contains a minimum of at least 3 wt % of the comonomer or comonomer combination; more preferably from 3 wt % to 40 wt %; still more preferably from 3 wt % to 30 wt %; and most preferably from 3 wt % to 20 wt %.

Particular embodiments of PVDCs that are suitable for use in the invention are those including as a comonomer an acrylate, such as methyl acrylate, ethyl acrylate, butyl acrylate, or a combination thereof, in an amount from 3 wt % to 20 wt %, based on the weight of the PVDC as a whole; more preferably from 3.5 wt % to 15 wt %; and most preferably from 4 wt % to 12 wt %. Another particular embodiment is a PVDC including vinyl chloride in an amount from 3 wt % to 30 wt %; more preferably from 7 wt % to 28 wt %; and most preferably from 9 wt % to 25 wt %.

It is also preferred that the overall weight average molecular weight (Mw) of the PVDC copolymer ranges from 10,000 to 250,000; more preferably from 50,000 to 200,000; and most preferably from 60,000 to 150,000.

The use of additives in the PVDC and carbon forming polymer-PVDC precursor membrane is also contemplated as being within the scope of the invention. Common additives may include, but are not necessarily limited to, epoxidized oil stabilizers such as epoxidized soybean oil, epoxidized linseed oil, and the diglycidyl ether of bisphenol A. Also frequently employed are liquid plasticizers such as aliphatic and aromatic esters, including for example dibutyl sebacate, acetyl tributyl citrate, dioctyl phthalate, and the like, and combinations thereof. Other common additives may include lubricants, such as polyethylene wax, paraffin wax, oxidized polyethylene wax, and combinations thereof. Lubricants may optionally be included, and may comprise, for example, high density polyethylene, acrylate copolymers and silicone polymers, and combinations thereof. Another group of additives that may be included are acid scavengers such as epoxy compounds, magnesium hydroxide, magnesium oxide, tetrasodium pyrophosphate, calcium phosphate, magnesium phosphate, DHT 4A (a synthetic hydrotalcite-like halogen scavenger available from Kyowa Chemical Industry), calcium oxide, calcium carbonate, and combinations thereof. Antioxidants such as phenolics may also be incorporated. Combinations of any or all of these types of additives may be included in the PVDC or carbon forming polymer-PVDC blend.

In proportion, it is preferred that the total amount of all additives combined be no more than 15 wt %, and more preferably no more than 8 wt % or 3 wt %. In many applications, however, an amount of all additives combined of at least 2 wt % may be typical, with use thereof therefore ranging preferably from 2 wt % to 8 wt %, and more preferably from 2 wt % to 3 wt %. Those skilled in the art will be aware of the use of such additives and their indications and contraindications without further direction herein.

The PVDC may be prepared by any typical or conventional methods of polymerization, including but not limited to mass polymerization, suspension polymerization, and emulsion polymerization, and preferably suspension polymerization or emulsion polymerization, may be employed. It is generally preferred that polymerization is carried out at a temperature that ensures avoidance of degradation of all of the PVDC components, e.g., preferably from 10° C. to 120° C.; more preferably from 20° C. to 100° C.; and most preferably from 30° C. to 90° C.

To mix or blend the carbon forming polymer and the PVDC, typically they are dissolved into a solvent and formed into a useful shape such as a thin membrane or hollow fiber. Illustratively, conventional procedures known in the art may be used (see, for example U.S. Pat. Nos. 5,820,659; 4,113,628; 4,378,324; 4,460,526; 4,474,662; 4,485,056; 4,512,893 and 4,717,394). Exemplary methods include coextrusion procedures including such as a dry-jet wet spinning process (in which an air gap exists between the tip of the spinneret and the coagulation or quench bath) or a wet spinning process (with zero air-gap distance) may be used to make the hollow fibers.

To make a homogeneous blend of the carbon forming polymer and PVCD, a dope solution is used comprised of the carbon forming polymer, PVDC, and solvents. Typically, when making a thin film membrane a dope solution comprised of a solvent that dissolves the carbon forming polymer (e.g., polyimide) and PVDC is used, for example, when casting onto a flat plate and the solvent removed. When making a hollow fiber, typically a dope solution that is a mixture of a solvent that solubilizes the carbon forming polymer and PVDC and a second solvent that does not solubilize (or to a limited extent solubilizes) the carbon forming polymer and PVDC, but is soluble with the solvent that solubilizes the carbon forming polymer are used. Exemplary solvents that are useful to solubilize, for example, the carbon forming polymer when it is polyimide and PVDC include N-Methyl-2-pyrrolidone (NMP), tetrahydrofuran (THF), dimethylacetamide (DMAc) and dimethylformamide (DMF). Exemplary solvents that do not solubilize the polyimide and PVDC, but are soluble with the solvents that do solubilize the polyimide include methanol, ethanol, water, and 1-propanol.

After the dope solution or just dope is formed, the dope is shaped, for example, into a hollow fiber as described above. After shaping, the solvents may be exchanged with other solvents (such as methanol and hexane) to prevent, for example, pore collapse, and the solvents are further removed by any convenient method such as application of heat, vacuum, flowing gases or combination thereof and include those known in the art to form the carbon forming polymer-PVDC carbon molecular sieve membrane precursor (also referred to herein as shaped membrane).

After removing the solvent, the shaped membrane such as the hollow fiber may be first heated to a dehydrochlorination temperature to further stabilize the shaped membrane polymers and in particular the PVDC. The heating to the dehydrochlorination temperature which is below the melting temperature of the PVDC (typically less than about 180° C., depending upon the exact composition of the PVDC), in order to dehydrochlorinate the PVDC in the shaped membrane by at least 10% removal of HCl. As used herein, the term "at least 10% dehydrochlorinated" means that the shaped membrane has been pre-treated, by removing hydrogen chloride, to a point at which the PVDC copolymer in the shaped membrane no longer melts and begins to become infusible. It is well-accepted in the art that such a change in molecular kinetics begins to occur at a point of approximately 10% dehydrochlorination and is completed or maintained as the level of dehydrochlorination increases above that point. This step is termed a dehydrochlorination because it occurs prior to a pyrolysis step or may be included during the pyrolysis heating to carbonize the shaped membrane.

During dehydrochlorination the temperature is preferably maintained in a range of from 100° C. to 180° C. (i.e., having a hold temperature), more preferably from 120° C. to 160° C., and most preferably from 130° C. to 150° C. This is preferably done in air for convenience, but other atmospheres, such as $N_2$ and other inert gases or oxidizing gases such as $CO_2$, or combinations thereof, may also or alternatively be used, since generally only minor levels of oxidation of the copolymer are anticipated within the overall given temperature range. Achievement of the desired dehydrochlorination, that is responsible for the formation of the locked structure, may be accomplished by exposure to a source of high energy irradiation, such as gamma rays, an electron beam, ultraviolet light, or a combination thereof. The time may vary from several minutes to 48 hr, preferably from 10 minutes to 24 hr, and most preferably from 1 hr to 12 hr, as needed to reach the at least 10% dehydrochlorination point, at which the copolymer begins to become infusible, i.e., no longer able to be melted. The dehydrochlorination degree can vary from 5% to 100%, depending upon temperature and time. Where more than visual confirmation of the beginning of infusibility is desired, additional confirmation of the percentage of dehydrochlorination may be obtained by means of, for example, Thermo Gravimetric Analysis (TGA), using standard and well-known methods and equipment.

It has been discovered that the formation of a carbon molecular sieve (CMS) from the carbon forming polymer-PVDC membrane precursor composition allows for the formation of a CMS asymmetric hollow fiber that has a wall that is defined by an inner surface and outer surface of said fiber and the wall has an inner porous support region (support layer) extending from the inner surface to an outer microporous region (separation layer) that extends from the inner porous support region to the outer surface. Surprisingly, it has been discovered when the membrane precursor composition is used, structural collapse of the inner porous support region may be avoided and the outer microporous separation layer may be tailored to be desirably thin in absence of any pretreatment of the polymeric asymmetric hollow fiber, for example, as described in PCT Publ. WO/2016/048612 or incorporation of an inorganic gel such as described in U.S. Pat. No. 9,211,504 described previously. Avoidance of structural collapse may be illustrated as follows. If the separation layer of the shaped membrane (i.e., before pyrolysis) is about 0.3 to about 10 micrometers, the corresponding CMS fiber separation layer thickness may be 20, 10, 7.5, 6.25, 5.5, 4.25 or 3.0 micrometers or less.

To form a CMS membrane from the shaped membrane, the shaped membrane is pyrolyzed to form the CMS membrane. The shaped membrane, which is typically an asymmetric hollow fiber may be pyrolyzed under various inert gas purge or vacuum conditions, preferably under inert gas purge conditions, for the vacuum pyrolysis, preferably at low pressures (e.g., less than 0.1 millibar). U.S. Pat. No. 6,565,631 and PCT Publ. WO 2017/165098 describe a suitable heating method for pyrolysis of the shaped membrane hollow fibers to form the CMS hollow fibers, and each is incorporated herein by reference. A pyrolysis temperature of between about 450° C. to about 800° C. may advantageously be used. The pyrolysis temperature may be adjusted in combination with the pyrolysis atmosphere to tune the performance properties of the resulting CMS hollow fiber membrane. For example, the pyrolysis temperature may be 1000° C. or more. Optionally, the pyrolysis temperature is maintained between about 500° C. and about 650° C. The pyrolysis soak time (i.e., the duration of time at the pyrolysis temperature) may vary (and may include no soak time) but advantageously is between about 1 hour to about 10 hours, alternatively from about 2 hours to about 8 hours, alternatively from about 4 hours to about 6 hours. An exemplary heating protocol may include starting at a first set point of about 70° C., then heating to a second set point of about 250° C. at a rate of about 13.3° C. per minute, then heating to a third set point of about 535° C. at a rate of about 3.85° C. per minute, and then a fourth set point of about 550° C. at a rate of about 0.25° C. per minute. The fourth set point is then optionally maintained for the determined soak time. After the heating cycle is complete, the system is typically allowed to cool while still under vacuum or in a controlled atmosphere.

Typically, the outer separation layer of the hollow fiber has a thickness of at most 10% of the wall extending from the inner surface to the outer surface. The outer separation layer typically has a thickness of 0.05 micrometers to 25 micrometers, desirably 0.05 micrometers to 10 micrometers, more desirably 0.05 to 5 micrometers. Herein, microporous shall mean pores <2 nm in diameter; mesoporous shall mean 2-50 nm in diameter and macroporous shall mean >50 nm in diameter. The microstructure of the separation layer in CMS is generally characterized with microporous pores. The support layer is generally characterized by a microstructure where the pores are microporous, macroporous or both.

In one embodiment the pyrolysis utilizes a controlled purge gas atmosphere during pyrolysis in which low levels of oxygen are present in an inert gas. By way of example, an inert gas such as argon is used as the purge gas atmosphere. Other suitable inert gases include, but are not limited to, nitrogen, helium, or any combinations thereof. By using any suitable method such as a valve, the inert gas containing a specific concentration of oxygen may be introduced into the pyrolysis atmosphere. For example, the amount of oxygen in the purge atmosphere may be less than about 50 ppm (parts per million) $O_2$/Ar. Alternatively, the amount of oxygen in the purge atmosphere may be less than 40 ppm $O_2$/Ar. Embodiments include pyrolysis atmospheres with about 8 ppm, 7 ppm, or 4 ppm $O_2$/Ar.

After pyrolyzing, the CMS membrane that has formed is cooled to a temperature where no further pyrolysis occurs. Generally, this is a temperature where no decomposition products would be evolved from the precursor polymer and may vary from polymer to polymer. Generally, the temperature is 200° C. or less and typically the temperature is taken as 100° C., 50° C. or essentially typical ambient temperatures (20 to 40° C.). The cooling may be at any useful rate, such as passively cooling (e.g., turning off the power to furnace and allowing to cool naturally). Alternatively, it may be desirable to more rapidly cool such as using known techniques to realize faster cooling such as removing insulation, or using cooling fans or employment of water cooled jackets.

After cooling, the CMS hollow fiber membrane may be subjected to a further treatment, for example, to make the fiber more stable or improve particular permeance/selectivity for particular gases. Such further treatments are described in US Pat. Publ. 2018/0369761, incorporated herein by reference.

The precursor composition enables the formation of an asymmetric hollow fiber CMS membrane absent the structural collapse described above and desirable separation of hydrogen from light hydrocarbons (e.g., olefins) or light hydrocarbon olefins from their corresponding paraffins with acceptable permeance (productivity). It is not understood why the CMS membranes formed from the precursor composition realizes these particular properties, but it may be due in part to the presence of chlorine in the CMS membrane and the effect of dehydrochlorination during the heating to pyrolyze the precursor membrane composition. The method typically results in a CMS membrane having a chlorine concentration of trace (above the detection limit ppm) to 0.1% by weight of the carbon molecular sieve membrane. Desirably, the chlorine concentration is, 10, 20, 25, or 50 parts per million to 1000 ppm. The amount of chlorine may be determined by known techniques such as neutron activation analysis.

The gas permeation properties of a membrane can be determined by gas permeation experiments. Two intrinsic properties have utility in evaluating the separation performance of a membrane material: its "permeability," a measure of the membrane's intrinsic productivity; and its "selectivity," a measure of the membrane's separation efficiency. One typically determines "permeability" in Barrer (1 Barrer=$10^{-10}$ [$cm^3$ (STP) cm]/[$cm^2$ s cmHg], calculated as the flux ($n_i$) divided by the partial pressure difference between the membrane upstream and downstream ($\Delta p_i$), and multiplied by the thickness of the membrane (l).

$$P_i = \frac{n_i l}{\Delta p_i}$$

Another term, "permeance", is defined herein as productivity of asymmetric hollow fiber membranes and is typically measured in Gas Permeation Units (GPU) (1 GPU=$10^{-6}$ [$cm^3$ (STP)]/[$cm^2$ s cmHg]), determined by dividing permeability by effective membrane separation layer thickness.

$$\left(\frac{P_i}{l}\right) = \frac{n_i}{\Delta p_i}$$

Finally, "selectivity" is defined herein as the ability of one gas's permeability through the membrane or permeance relative to the same property of another gas. It is measured as a unit less ratio.

$$\alpha_{i/j} = \frac{P_i}{P_j} = \frac{(P_i/l)}{(P_j/l)}$$

In a particular embodiment, the asymmetric hollow CMS membrane produced by the method enables a carbon hollow fiber CMS membrane that has a permeance of at least 5 GPU for a target gas molecule (permeate) and a selectivity of at least 10. In particular embodiments the permeate/retentate gas molecule pairs may be ethylene/ethane, propylene/propane, butylene/butane, hydrogen/ethylene, carbon dioxide/ methane, water/methane, oxygen/nitrogen, or hydrogen sulfide/methane. Illustratively, the feed gas generally is comprised of at least 50% of the permeate gas molecule (e.g., ethylene or propylene) and 25% of the retentate gas molecule (e.g., ethane or propane).

In a particular embodiment the CMS membrane produced has a permeance of at least 60 GPU for hydrogen (permeate) and a selectivity of at least 120 for hydrogen/ethylene. Desirably, in this embodiment the permeance is at least 80, 90 or even 100 GPU for hydrogen. Likewise, in this embodiment the selectivity is at least 125, 130 or 135 for hydrogen/ethylene.

The CMS membranes are particularly suitable for separating gases that are similar in size such as described above, which involves feeding a gas feed containing a desired gas molecule and at least one other gas molecule through the CMS membrane. The flowing of the gas results in a first stream having an increased concentration of the desired gas molecule and, a second stream having an increased concentration of the other gas molecule. The process may be utilized to separate any of the aforementioned gas pairs and in particular is suitable for separating ethylene and ethane or propylene and propylene. When practicing the process, the CMS membrane is desirably fabricated into a module comprising a sealable enclosure comprised of a plurality of carbon molecular sieve membranes that is comprised of at least one carbon molecular sieve membrane produced by the method of the invention that are contained within the sealable enclosure. The sealable enclosure has an inlet for introducing a gas feed comprised of at least two differing gas molecules; a first outlet for permitting egress of a permeate gas stream; and a second outlet for egress of a retentate gas stream.

EXAMPLES

Examples 1-5: Asymmetric CMS Films

XUS32904.01 PVDC resin, (The Dow Chemical Company, Midland, MI), is a PVDC copolymer containing about 4.8 wt % of methyl acrylate comonomer. The XUS32904.01 resin was dissolved with MATRAMID 5218 polyimide (Huntsman Advanced Materials Americas, The Woodlands, TX) or polyvinyl chloride (PVC) Mw~62,000 and Mn~35,000 (Sigma-Aldrich Inc., St. Louis, MO, Part #189588) in tetrahydrofuran (THF), and n-methyl-2-pyrrolidone (NMP) available from Aldrich as shown in Table 1. The solvent polymer mixtures were heated to ~60-80° C. to speed the polymer dissolution. The solution was cooled to room temperature before film casting. The polymer solution was poured onto glass plate and casted using a 10 mil knife. After 10 seconds, the glass plate with casted polymer solution was dipped into a water bath at room temperature causing phase inversion and resulting in asymmetric films. Asymmetric polymer films were obtained after about 1-3 days in the water.

TABLE 1

Polymer Blend Compositions

| Example | Polymer Blend | PVDC [wt %] | Carbon forming polymer [wt %] | NMP [wt %] | THF [wt %] |
|---|---|---|---|---|---|
| 1 | PVDC:PVC | 12 | 18 | 70 | |
| 2 | PVDC:MATRIMID | 9 | 18 | 73 | |
| 3 | PVDC:MATRIMID | 6 | 18 | 76 | |
| 4 | PVDC:MATRIMID | 6 | 18 | 60 | 16 |
| 5 | PVDC:MATRIMID | 4.75 | 19 | 60 | 16.25 |

One inch diameter (25.4 mm) disks were cut out of the asymmetric polymer films. Batches of 12 disks of each Example were treated as follows. An initial low temperature pretreatment was performed by sandwiching the 12 disks between 0.1 kg porous mullite honeycombs. HCl that was generated in this dehydrochlorination or pretreatment step was transported through the honeycomb channels. A scrubber connected to the oven contained a 10 wt % sodium hydroxide aqueous solution neutralized the HCl. The oven with the 12 disks was heated at 1° C./min to 150° C. and held for 12 hours under 2 L/min of flowing air. The 12 pretreated disks were then sandwiched between the same honeycomb plates and loaded into a nitrogen purged 5.5" OD quartz tube furnace. A scrubber connected to this furnace contained a 10 wt % sodium hydroxide aqueous solution to neutralize any further HCl evolved during the heating to pyrolyze the dehydrochlorinated disks. The furnace was raised to a final temperature of 550° C. at a ramp rate of 3° C./min, and held for 30 minutes at the final temperature, then cooled down to room temperature (~25° C.) to form the CMS membranes. After cooling, the CMS membranes were put into storage box continuously purged with dry nitrogen at a flow rate of 5 Liter/min.

CMS Membrane Permeation Testing

The CMS membranes were masked onto a standard 25 mm filter holder (Millipore #4502500, EMD Millipore Corp., Germany) using an impermeable aluminum tape, leaving defined permeation area. A two-part epoxy (J-B Weld twin tube) was then applied along the interface of the tape and the carbon membranes. Mixture gases were tested at 20° C. with a continuous feed at the upstream (equimolar mixture containing 25 sccm hydrogen, 25 sccm carbon dioxide, 25 sccm methane, total 1 atm) and He purge at the downstream (2.0 sccm, 1 atm). The permeate carried by the He purge gas was analyzed by GC (gas chromatograph) with a TCD (thermal conductivity detector for $H_2$ and $CO_2$) and FID (flame ionization detector for $CH_4$ and other hydrocarbons). The concentrations in all cases were lower than 5%, so the gas flow rate in downstream was considered the same as the He flow rate. The permeate rate was calculated using the He purge flow rate times the permeate concentrations measured by GC. The order of testing was kept in the order of $H_2$, $CO_2$, and $CH_4$. The tests were run for several hours to days until the permeate concentrations were steady. The permeation results of the triplicate test are shown in Table 2.

Examples 4 and 5 CMS membranes from showed high gas permeance and selectivity. The Example 4 CMS membranes having a higher content of PVDC displayed greater permeance than the Example 5 CMS membranes with differing selectivities indicating that the amount of PVDC may be used to tailor the performance of the separation membranes for particular gas pairs to be separated.

TABLE 2

| Ex. | $H_2$ permeance [GPU] | $CO_2$ permeance [GPU] | $CH_4$ permeance [GPU] | $C_2H_4$ permeance [GPU] | $C_2H_6$ permeance [GPU] | $C_3H_6$ permeance [GPU] | $C_3H_8$ permeance [GPU] |
|---|---|---|---|---|---|---|---|
| 4 (Disk 1) | 341.1 | 457.5 | 12.7 | 11.5 | 4.3 | 14.0 | 1.2 |
| 4 (Disk 2) | 280.4 | 226.3 | 5.1 | 5.6 | 1.9 | 4.4 | 0.6 |
| 4 (Disk 3) | 276.5 | 227.7 | 6.4 | 7.0 | 2.7 | 5.6 | 1.0 |
| 5 (Disk 1) | 126.5 | 85.3 | 1.7 | 3.0 | 0.8 | 1.6 | 0.2 |
| 5 (Disk 2) | 143.1 | 78.4 | 2.3 | | | | |
| 5 (Disk 3) | 84.1 | 68.7 | 1.3 | 2.4 | 0.6 | 1.4 | 0.1 |

Disk # = separate disk test of the indicated Example.

Example 6 Blend Asymmetric CMS Hollow Fiber

PVDC resin (XUS32904.01), MATRIMID 5218 polyimide, NMP, and THF were mixed in a three neck flask with a weight ratio of 6:18:60:16. The mixture was heated to ~80° C. to speed the polymer dissolution to form a homogeneous dope solution.

The homogeneous dope was loaded into a 500 milliliter (mL) syringe pump and allow the dope to degas overnight by heating the pump to a set point temperature of 50° C. to 60° C. using a heating tape.

Bore fluid (85 wt % NMP and 15 wt % water, based on total bore fluid weight) was loaded into a separate 100 mL syringe pump and then the dope and bore fluid were co-extruded through a spinneret operating at a flow rate for of 180 milliliters per hour (mL/hr) for the dope; 60 mL/hr bore fluid, filtering both the bore fluid and the dope in line between delivery pumps and the spinneret using 40 μm and 2 μm metal filters. The temperature was controlled using thermocouples and heating tape placed on the spinneret, dope filters and dope pump at a set point temperature of 70° C.

After passing through a fifteen centimeter (cm) air gap, the nascent fibers that were formed by the spinneret were quenched in a water bath (50° C.) and the fibers were allowed to phase separate. The fibers were collected using a 0.32 meter (M) diameter polyethylene drum passing over TEFLON guides and operating at a take-up rate of 30 meters per minute (M/min).

The fibers were cut from the drum and rinsed at least four times in separate water baths over a span of 48 hours. The rinsed fibers in glass containers and effect solvent exchange three times with methanol for 20 minutes and then hexane for 20 minutes before recovering the fibers and drying them under vacuum at a set point temperature of 110° C. for one hour or drying under vacuum at 75° C. for 3 hours.

The hollow fibers were pyrolyzed to form the CMS membranes by placing the precursor fibers on a stainless steel wire mesh plate each of them bound separately to the plate using stainless steel wire. The combination of hollow fibers and mesh plate were placed into a quartz tube that sits in a tube furnace. The polymer asymmetric hollow fibers were pretreated and pyrolyzed in the same manner as the Example 1-5 films. After cooling down, the carbon fibers were put into storage box continuously purged with dry nitrogen at a flow rate of 5 Liter/min. The obtained CMS asymmetric hollow fiber membranes were mounted into a Swagelok module with epoxy seal at the ends for the permeation tests, which were performed in the same manner as described above for the film permeation tests.

Example 7-8 Blend Asymmetric CMS Hollow Fiber

Example 7 was made using the same procedure as in Example 6, except the fibers were pretreated to a temperature of 170° C. prior to pyrolyzing.

Example 8 was made using the same procedure as in Example 6, except no pretreatment was performed with dehydrochlorination occurring during the pyrolysis heating.

Comparative Example 1

MATRIMID 5218 polyimide, NMP, and THF, and ethanol (Aldrich) were mixed in a three neck flask with a weight ratio of 26.2:53:5.9:14.9. The solution was dissolved and spun into hollow fiber using the same procedure as used in Example 6. The pyrolysis step was the same as Example 8, since it was not necessary to remove any HCl. The permeation test was performed in the same manner as in Example 6.

Figure 2:
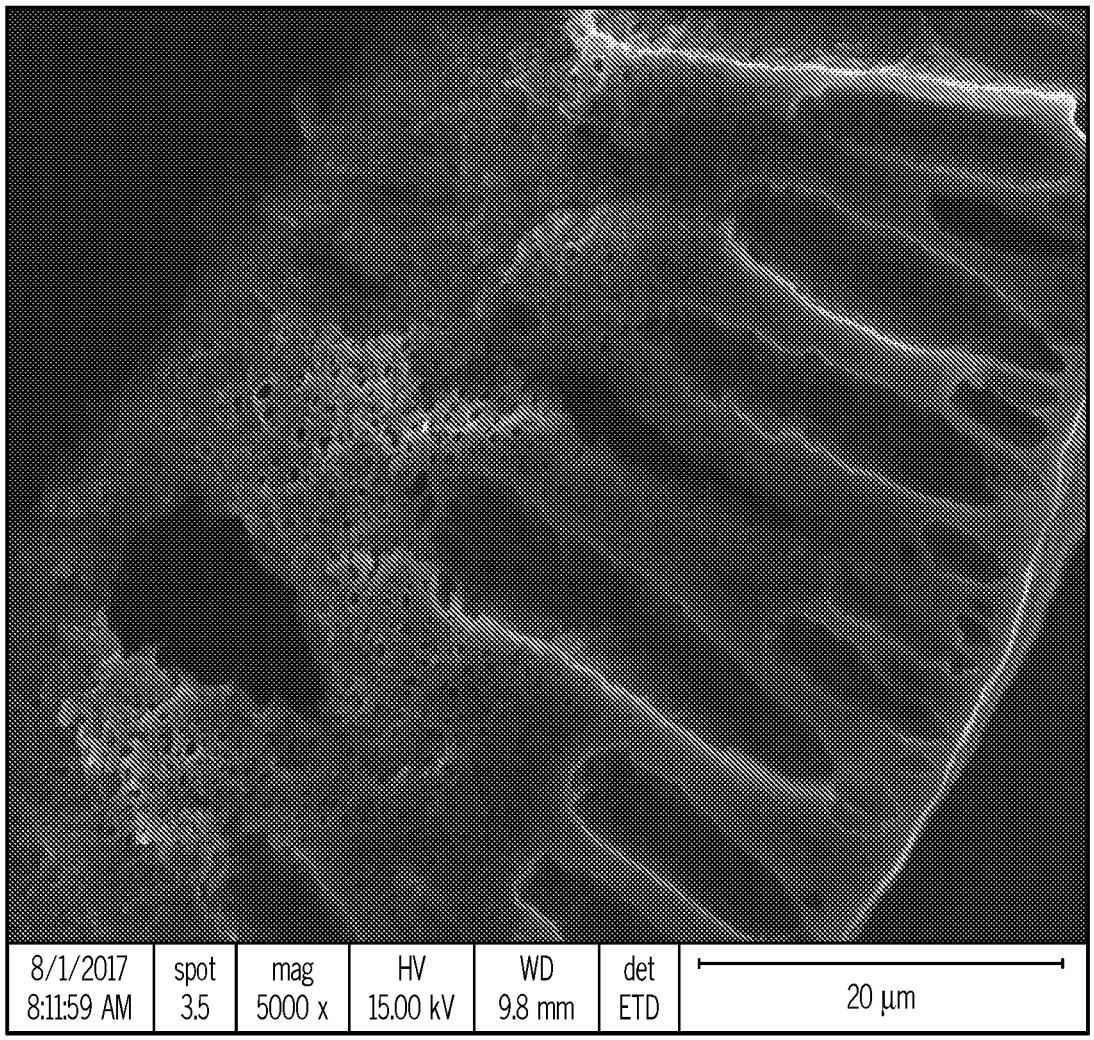
FIG. 2 is a scanning electron micrograph of a cross-section of a portion of a CMS asymmetric hollow fiber formed from the polyimide-PVDC asymmetric fiber of FIG. 1.
Figure 3:
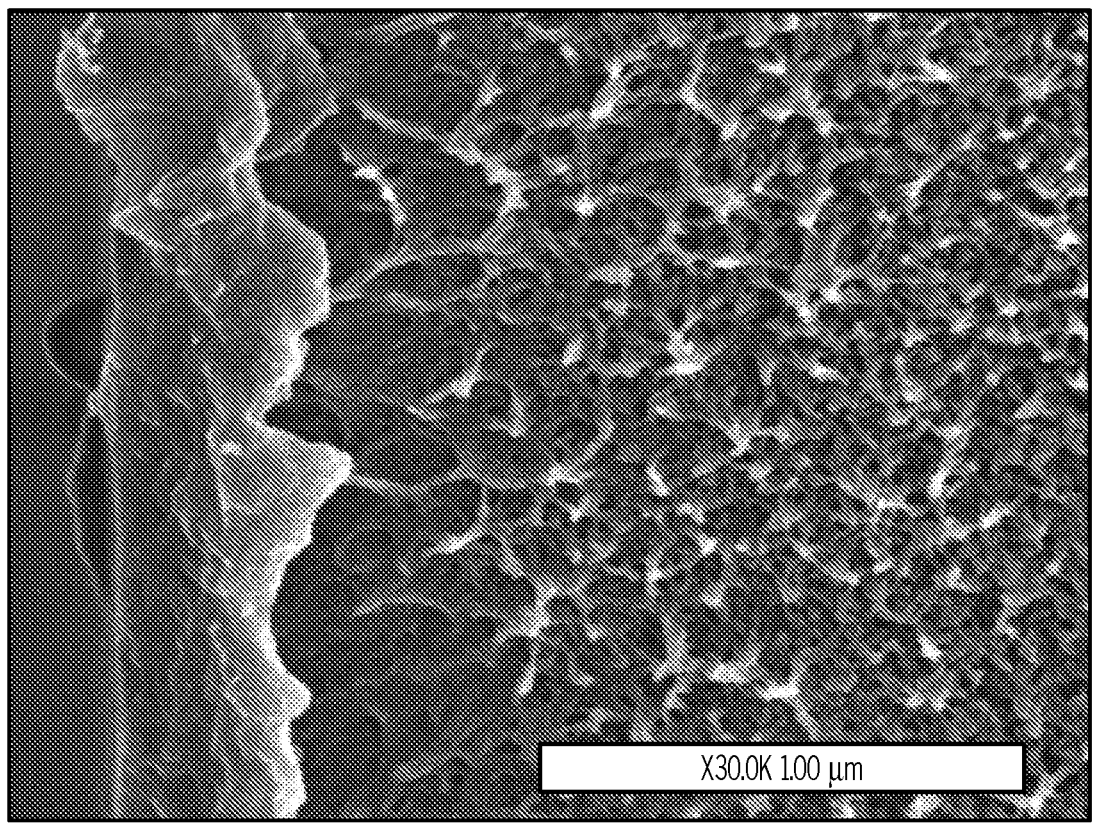
FIG. 3 is a scanning electron micrograph of a cross-section of a portion of polyimide asymmetric hollow fiber not of this invention.
Figure 4:
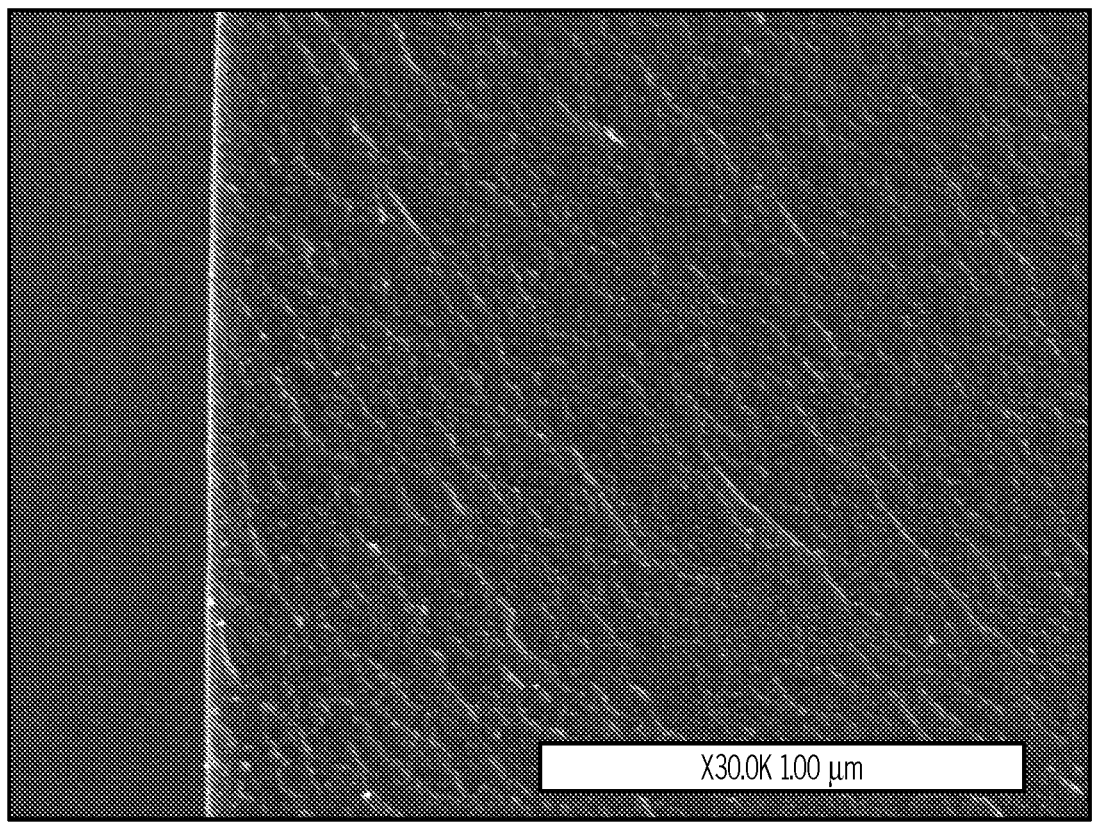
FIG. 4 is a scanning electron micrograph of a cross-section of a portion of a CMS asymmetric hollow formed from the polyimide fiber of FIG. 3.

FIG. 1 is a scanning electron micrograph (SEM) of the cross-section of the precursor polymer hollow fiber of Example 6. FIG. 2 is a SEM of the corresponding CMS hollow fiber of Example 6 showing that the microstructure of the precursor is maintained with little or no sintering collapsing of the outer separation layer of the resultant CMS asymmetric hollow fiber. In contrast, FIG. 3 is a SEM of the cross-section of the precursor polymer hollow fiber of Comparative Example 1 and FIG. 4 is a SEM of the cross-section of the corresponding CMS hollow fiber. From the FIGS. 3 and 4, it is readily apparent that substantial sintering and collapse of the separation layer has occurred. In essence, the whole wall of Comparative Example 1's asymmetric hollow fiber densified. In contrast, the dense skin layer of the Example 6 hollow fiber was less than 10 micrometers The permeance of five probe gases for the CMS fiber of Examples 6 to 8 is 4-40 times higher than those for the Comparative Example 1 fiber (Table 3). From the results, it is readily apparent that the use of the PVDC blended with the polyimide realizes a substantially higher permeant fiber while retaining good selectivity for desirable gas pairs. Example 6 has much higher gas pair selectivities than example 7 and 8. The only difference between 6, 7, and 8 is the pretreatment temperature hold or lack thereof, clearly showing that the permeance and selectivity may be optimized for particular gas pairs, while exhibiting much greater productivity due to the much higher permeance.

TABLE 3

| CMS fiber permeation properties | | | | | |
|---|---|---|---|---|---|
| Example | $H_2$ permeance [GPU] | $CO_2$ permeance [GPU] | $CH_4$ permeance [GPU] | $C_2H_4$ permeance [GPU] | $C_2H_6$ permeance [GPU] |
| 6 (Fiber 1) | 461.4 | 130.1 | 3.4 | 6.2 | 2.1 |
| 6 (Fiber 2) | 536.5 | 173.2 | 4.0 | 9.8 | 2.9 |
| 7 (Fiber 1) | 592.3 | 122.3 | 46.4 | 46.6 | 35.6 |

TABLE 3-continued

| | CMS fiber permeation properties | | | | |
|---|---|---|---|---|---|
| Example | $H_2$ permeance [GPU] | $CO_2$ permeance [GPU] | $CH_4$ permeance [GPU] | $C_2H_4$ permeance [GPU] | $C_2H_6$ permeance [GPU] |
| 7 (Fiber 2) | 277.0 | 77.3 | 24.1 | 20.2 | 16.7 |
| 8 (Fiber 1) | 828.3 | 185.3 | 124.6 | 98.8 | 89.5 |
| Comp. Ex. 1 (Fiber 1) | 22.2 | 38.7 | 0.6 | 2.0 | 0.4 |

The invention claimed is:

1. A membrane precursor composition comprised of a carbon forming polymer blended with a polyvinylidene chloride copolymer, the polyvinylidene chloride copolymer being the reaction product of at least 60% to 97% by weight of vinylidene chloride and at least one other comonomer and the carbon forming polymer to polyvinylidene chloride copolymer has a weight ratio of greater than 1 to 99.

2. The membrane precursor of claim 1, wherein the carbon forming polymer is a polyimide, polyetherimide, polyamide, polyvinyl chloride, polyvinylidene fluoride, cellulose acetate, polyacrylonitrile, polyphenylene, or combination thereof.

3. The membrane of claim 1, wherein the carbon forming polymer is polyimide.

4. The membrane precursor of claim 1, wherein the comonomer is vinyl monomer, vinyl chloride monomer, an acrylate monomer, a methacrylate monomer, a styrenic monomer, acrylonitrile, methacrylonitrile, itaconic acid, chlorotrifluoroethylene, or a combination thereof.

5. The membrane precursor of claim 1, wherein the vinylidene chloride is at least 70% by weight of the polyvinylidene chloride copolymer.

6. The membrane precursor of claim 1, wherein the weight ratio of the carbon forming polymer to polyvinylidene chloride copolymer is from 2 to 10.

7. The membrane precursor of claim 3, wherein the polyimide is an aromatic polyimide that is a reaction product of a diamine and dianhydride.

8. The membrane precursor of claim 7, wherein the aromatic polyimide is the reaction product of at least one of the following diamines: 2,4,6-trimethyl-1,3-phenylenediamine (DAM), 3,5-diaminobenzoic acid (DABA), 2,3,5,6-tetramethyl-1,4-phenylenediamine (durene), or tetramethyl-methylenedianiline (TMMDA) and at least one of the following dianhydride 5,5'-[2,2,2-trifluoro-1-(trifluoromethyl)ethylidene]-1,3-isobenzofurandion (6FDA), 3,3',4,4'-biphenyl tetracarboxylic dianhydride (BPDA), pyromellitic dianhydride (PMDA), 1,4,5,8-naphthalene tetracarboxylic dianhydride (NTDA), and benzophenone tetracarboxylic dianhydride (BTDA).

9. A method of forming a carbon forming polymer-polyvinylidene chloride copolymer carbon molecular sieve membrane precursor, the method comprising:
   (i) dissolving a carbon forming polymer and a polyvinylidene chloride copolymer, polyvinylidine chloride copolymer being the reaction product of at least 60% by weight of vinylidene chloride and at least one other comonomer and the carbon forming copolymer and polyvinylidene chloride copolymer are present in a weight ratio of greater than 1 to 99 carbon forming copolymer/polyvinlylidine chloride copolymer to form a dope of the polyimide and polyvinylidene chloride copolymer in the solvent;
   (ii) shaping the dope solution to form a shape; and
   (iii) removing the solvent to form the carbon forming polymer-polyvinylidene chloride copolymer carbon molecular sieve membrane precursor.

10. The method of claim 9, wherein the shape is an asymmetric hollow fiber.

11. The method of claim 9, wherein carbon forming polymer-polyvinylidene chloride copolymer carbon molecular sieve membrane precursor is heated to a dehydrochlorination temperature from 100° ° C. to 180° C. to form a dehydrochlorinated precursor carbon molecular sieve membrane.

12. The method of claim 11, further comprising heating the dehydrochlorinated precursor carbon molecular sieve membrane to a pyrolysis temperature of 450° C. to 1200° ° C. for a time or at least 15 minutes to 72 hours under a nonoxidizing atmosphere.

13. The method of claim 9, wherein the carbon forming polymer is a polyimide, polyetherimide, polyamide, polyvinyl chloride, polyvinylidene fluoride, cellulose acetate, polyacrylonitrile, polyphenylene oxide, or combination thereof.

14. The method of claim 13, wherein carbon forming polymer is the polyimide.

* * * * *